US008926006B2

(12) United States Patent
Mildner et al.

(10) Patent No.: US 8,926,006 B2
(45) Date of Patent: Jan. 6, 2015

(54) UNDERBODY STRUCTURE FOR AT LEAST TWO MOTOR VEHICLES

(71) Applicant: GM Global Technology Operations LLC, Detroit, MI (US)

(72) Inventors: Udo Mildner, Limburg (DE); Stefan Gloger, Muehltal (DE); Stanislaw Klimek, Franfurt am Main (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/649,388

(22) Filed: Oct. 11, 2012

(65) Prior Publication Data

US 2013/0099526 A1    Apr. 25, 2013

(30) Foreign Application Priority Data

Oct. 11, 2011 (DE) .......................... 10 2011 115 586

(51) Int. Cl.
    *B62D 25/20*    (2006.01)
(52) U.S. Cl.
    CPC ............ *B62D 25/2009* (2013.01); *B26D 21/14* (2013.01); *B26D 25/2027* (2013.01); *B26D 63/025* (2013.01)
    USPC .................................................... 296/193.07
(58) Field of Classification Search
    USPC .................. 296/204, 193.07, 187.08, 193.08, 296/203.04, 187.11
    See application file for complete search history.

(56) References Cited

U.S. PATENT DOCUMENTS

| 3,022,105 A | | 2/1962 | Tjaarda | |
|---|---|---|---|---|
| 4,865,378 A | * | 9/1989 | Filtri et al. | ..................... 296/204 |
| 5,102,187 A | | 4/1992 | Harasaki | |
| 6,951,366 B2 | * | 10/2005 | Tomita | ..................... 296/203.04 |

FOREIGN PATENT DOCUMENTS

| DE | 2610299 A1 | 9/1977 |
|---|---|---|
| DE | 19722139 A1 | 12/1997 |
| DE | 10014837 A1 | 9/2001 |
| DE | 102006052992 A1 | 5/2008 |
| DE | 102009007035 A1 | 8/2010 |
| DE | 102009041370 A1 | 3/2011 |
| DE | 102010048350 A1 | 4/2012 |
| EP | 1759962 A1 | 3/2007 |
| GB | 2481095 A | 12/2011 |

OTHER PUBLICATIONS

German Patent Office, German Search Report for Application No. 102011115586.8, dated Aug. 17, 2012.

* cited by examiner

*Primary Examiner* — Joseph D Pape
*Assistant Examiner* — Dana Ivey
(74) *Attorney, Agent, or Firm* — Ingrassia Fisher & Lorenz, P.C.

(57) ABSTRACT

An underbody structure for at least two motor vehicles, in particular for at least two passenger cars having a first and a second wheelbase, is provided. The underbody structure comprises a middle underbody structure and a rear underbody structure with laterally arranged side members, between which at least one connecting profile is arranged. The connecting profile is connected to the side members and to a floor of the middle underbody structure to form a first overlap region for the first wheelbase and a second overlap region for the second wheelbase. The first and the second overlap region have an at least approximately same width.

14 Claims, 4 Drawing Sheets

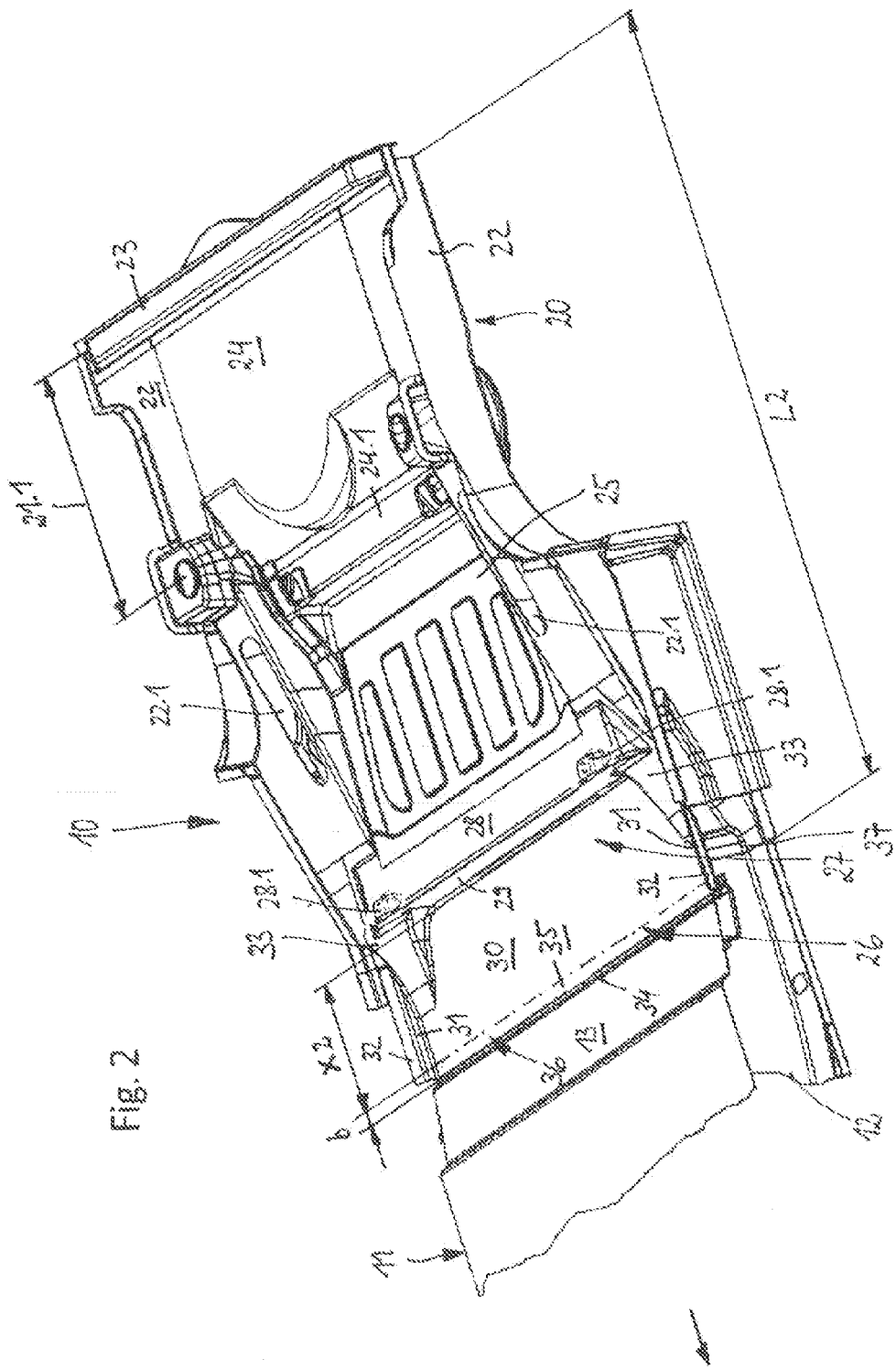

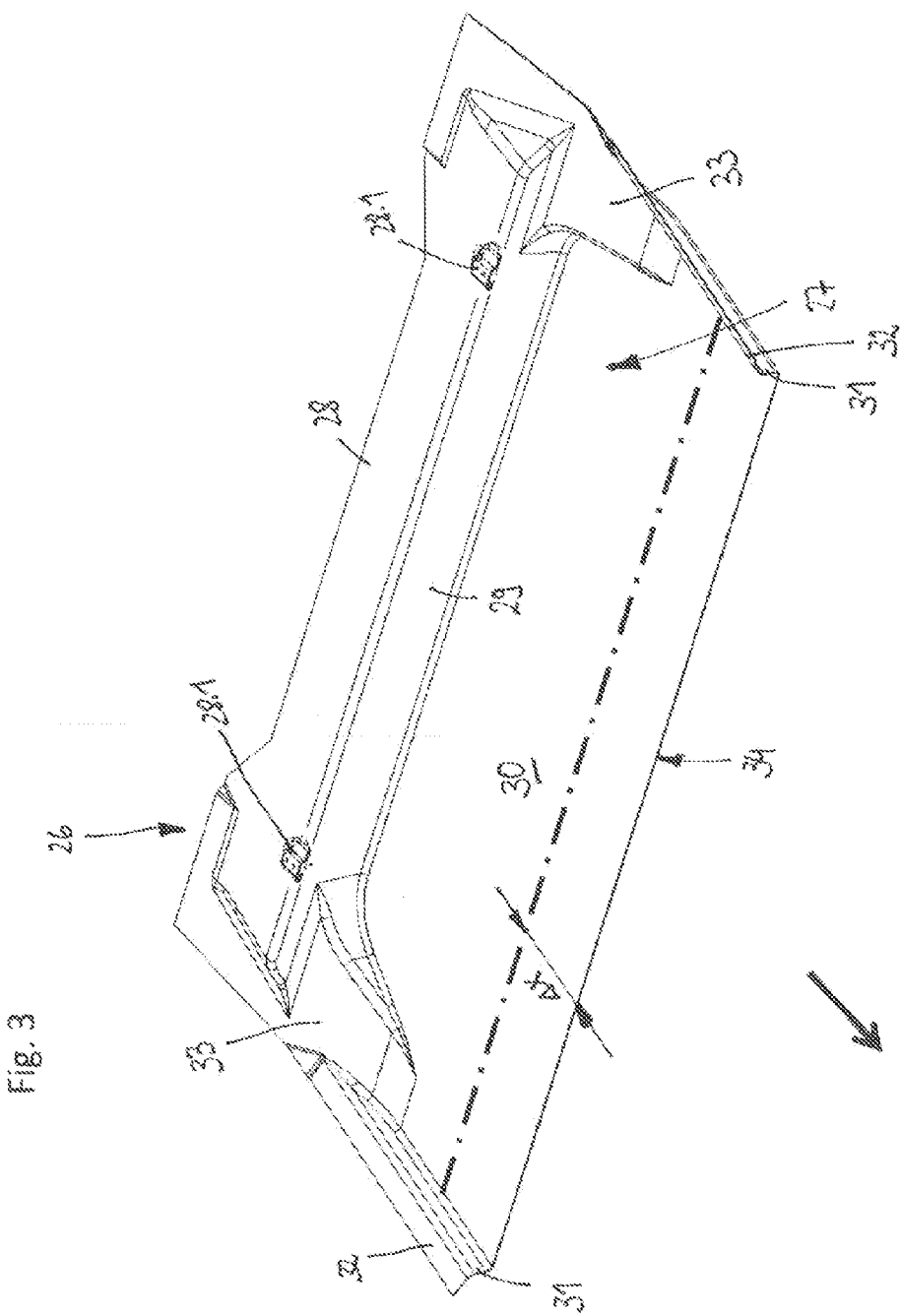

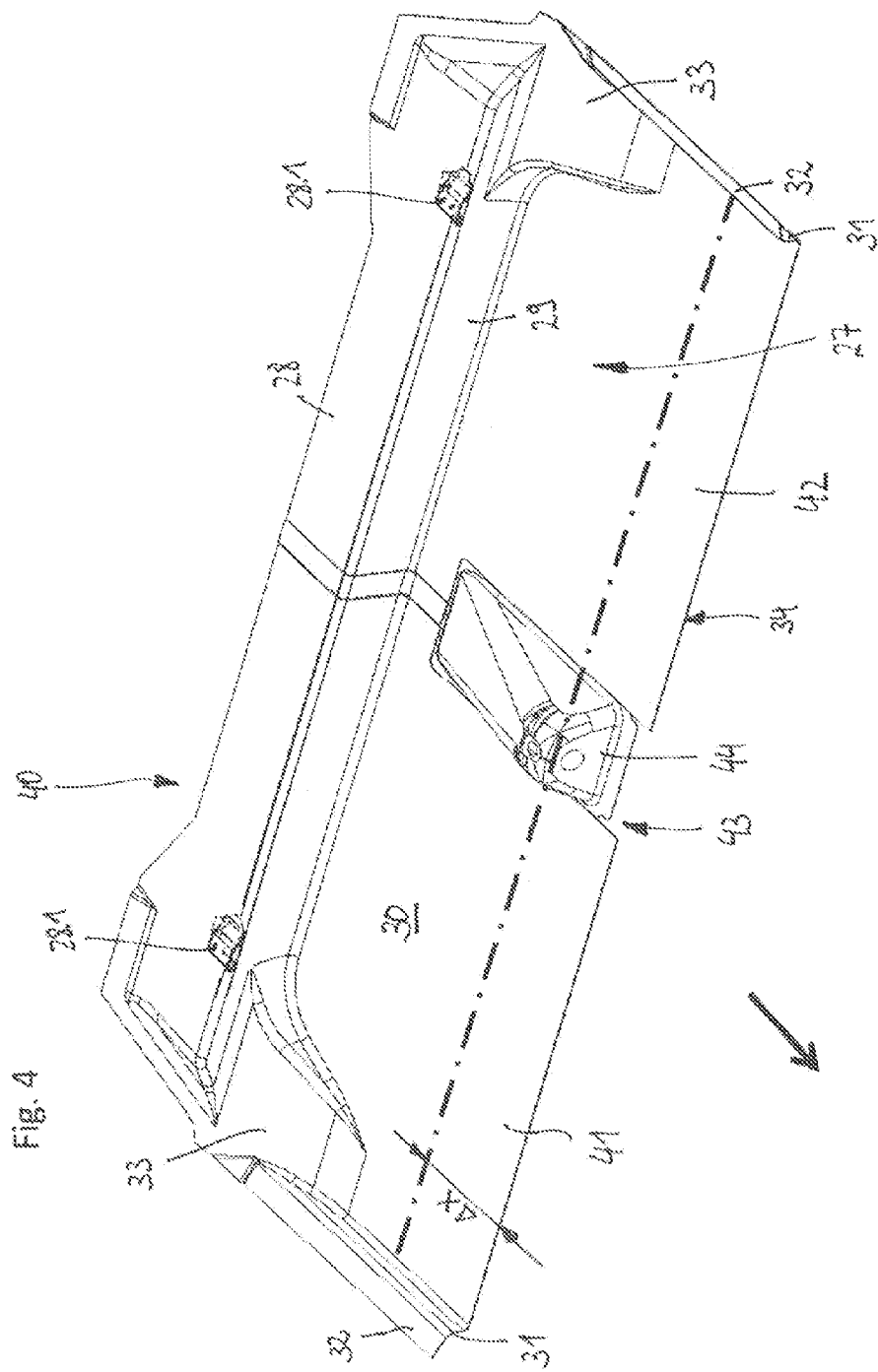

UNDERBODY STRUCTURE FOR AT LEAST TWO MOTOR VEHICLES

CROSS-REFERENCE TO RELATED APPLICATION

This application claims priority to German Patent Application No. 10 2011 115 586.8, filed Oct. 11, 2011, which is incorporated herein by reference in its entirety.

TECHNICAL FIELD

The technical field relates to an underbody structure for at least two motor vehicles, in particular for at least two passenger cars having a first and a second wheelbase. The application further pertains to at least two passenger cars having the first and second wheelbase which comprises a middle underbody and a rear underbody structure with lateral side members, between which at least one connecting profile is arranged, which is connected to the side members and to a floor of the middle underbody structure subject to forming a first overlap region for the first wheelbase and subject to forming a second overlap region for the second wheelbase.

BACKGROUND

From the German Disclosure Publication DE 2 610 299 A1 an underbody structure for motor vehicles is known, with the help of two different-length wheelbases for a passenger car can be created. To this end, a cross member serving as connecting profile is provided between a middle and a rear underbody structure, which comprises a vertical web from which on the end side horizontal legs which with their free ends are directed in opposite directions, branch off. On these legs, the middle and the rear underbody structure respectively for different-length wheel bases are fastened, which result in different-length overlaps in the fastening regions. While with a long wheelbase the overlap region in the fastening zone reaches very closely up to the free ends of the legs of the connecting profile an overlap region which takes up almost the entire leg length of the connecting profiles is obtained for the short wheelbase.

Through overlap regions which are designed in such different manners problems are not only produced with the dimensioning of the fastening zones but also structural restrictions with the implementation of the long wheelbase at the connecting point between the middle and the rear underbody structure.

Accordingly, it is desirable to provide an underbody structure that avoids these disadvantages. In addition, other objects, desirable features and characteristics will become apparent from the subsequent summary and detailed description, and the appended claims, taken in conjunction with the accompanying drawings and this background.

SUMMARY

According to one of various aspects of the present disclosure, provided is an underbody structure for at least two motor vehicles, in particular for at least two passenger cars having a first and a second wheelbase, wherein the underbody structure comprises a middle underbody structure and a rear underbody structure with lateral side members, between which at least one connecting profile is arranged. The connecting profile is connected to the side members and to a floor of the middle underbody structure subject to forming a first overlap region for the first wheelbase and subject to forming a second overlap region for the second wheelbase, wherein the first and the second overlap region have an at least approximately same width.

Through the solution according to the present disclosure a defined fastening situation is created between the rear and the middle underbody structure with different-length wheelbases, as a result of which an automated connecting method, such as for example a welding method, can be applied with a significantly higher functional safety. In addition, through the substantially identical overlap width the static and dynamic load capacity on the connecting region defined by the overlap region is at least approximately the same.

According to one of various exemplary embodiments, the overlap region that is at least largely of the same width for different-length wheelbases can be simply created in production terms in that for a shorter wheelbase either the connecting profile or the middle underbody structure or both these as well as the connecting profile is shortened by a dimension corresponding to this shorter wheelbase.

For example, the connecting profile comprises a step running between the side members, with a horizontal portion comprising the overlap region and a vertical portion projecting upwards following said horizontal portion, from which vertical portion the overlap region is spaced by a predetermined dimension.

With this it is ensured that the overlap region and thus the so-called separating line between the rear underbody structure and the middle underbody structure is shifted nearer to the latter, while the position in the separating line and thus the overlap region can be determined through a suitable definition of the predetermined dimension.

According to another exemplary embodiment of the present disclosure it is provided that the connecting profile in longitudinal direction of the side members is divided into at least two part portions, which for example, accommodate between them a function part such as a cover for a cable of a handbrake or the like.

By dividing the connecting profile, different constructional conditions of the rear underbody structure in the region of the connecting profile can be taken into account in a simple manner.

For example, the overlap region is arranged on the horizontal portion on its transverse edge facing the middle underbody structure.

According to another exemplary embodiment of present disclosure it is provided that the connecting profile on its horizontal portion is formed at least approximately in the manner of a shell.

Through the shell-like forming of the connecting profile, the latter can be produced stiffer with respect to the connection and support in a simple manner for example through a deep-drawing process.

In that the connecting profile on its horizontal portion is designed longer for the first wheelbase than for the second wheelbase, an overlap region that remains the same for both wheelbases is obtained which can be created in a simple manner with respect to production in that the connecting profile for the shorter wheelbase is, for example, chiplessly reduced to a predetermined length dimension.

In one example, the connecting profile for forming the second wheelbase is shortened to a predetermined length dimension.

According to another exemplary embodiment of the present disclosure it is provided that the connecting profile in the region of its vertical portion comprises mountings in which the side members at least partially engage. Because of this, a connection of the connecting profile to the side members that is stiff with respect to support and connection is created.

The connecting profile is connected to a sill structure arranged laterally next to the connecting profile in a manner that is generally simple and stiff with respect to support, when according to another exemplary embodiment of the present disclosure it is provided that the connecting profile on its horizontal portion is laterally provided with connecting flanges for connecting to a sill structure laterally arranged next to the connecting profile.

The connecting flanges can be produced in a generally simple manner when according to another exemplary embodiment of present disclosure it is provided that the connecting flanges are co-formed into the lateral edges of the shell.

The length of the side members of the rear underbody structure for forming the second wheelbase can be adapted in a generally simple manner in production terms when according to another exemplary embodiment of the present disclosure it is provided that the side members of the rear underbody structure are shortened to a predetermined length dimension for forming the second wheelbase.

At the same time, a weight optimization for the underbody structure is also brought about with such a solution. For example, the side members of the rear underbody structure are shortened on their ends facing the middle underbody structure to the predetermined length dimension for the second wheelbase. Because of this, a short wheelbase without effect on the tail overhang can be created.

According to another exemplary embodiment of the present disclosure it is provided that the side members of the rear underbody structure at their end facing the middle underbody structure and at the end located opposite thereof, are shortened to the predetermined length dimension for the second wheelbase.

Through such a measure, a shortened wheelbase with simultaneously shortened tail overhang can be created on the rear underbody structure in a simple manner.

The rear underbody structure can be produced in a generally simple manner when according to another exemplary embodiment of the present disclosure it is provided that rear mountings, for example, mountings shaped in an elongated manner for a seat fastening, generally on the top of the side members are provided, whose position both for the first as well as for the second wheelbase based on the vertical portion of the connecting profile comprises at least an approximately same spacing.

Generally, front mountings for a seat fastening are located in front of the rear mountings towards the middle underbody structure, whose position for the second wheelbase is arranged nearer to the rear mountings.

Because of this, a leg freedom that is at least approximately the same for both wheelbases is created for the set of seats provided in the rear of a vehicle, for example, of a passenger car.

Generally, the front mountings are arranged on the connecting profile, for example, on a region that is adjacent to the vertical portion.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 2 is a longitudinal section formed of a rear underbody structure and a middle underbody structure of a second underbody structure designed for a short wheelbase, in three-dimensional view from above;

FIG. 3 is a first exemplary embodiment of a connecting profile serving for the connection of the rear to the middle underbody structure in three-dimensional view from above; and FIG. 4 is a second exemplary embodiment of the connecting profile divided in longitudinal direction in three-dimensional view from above.

DETAILED DESCRIPTION

Figure 1:
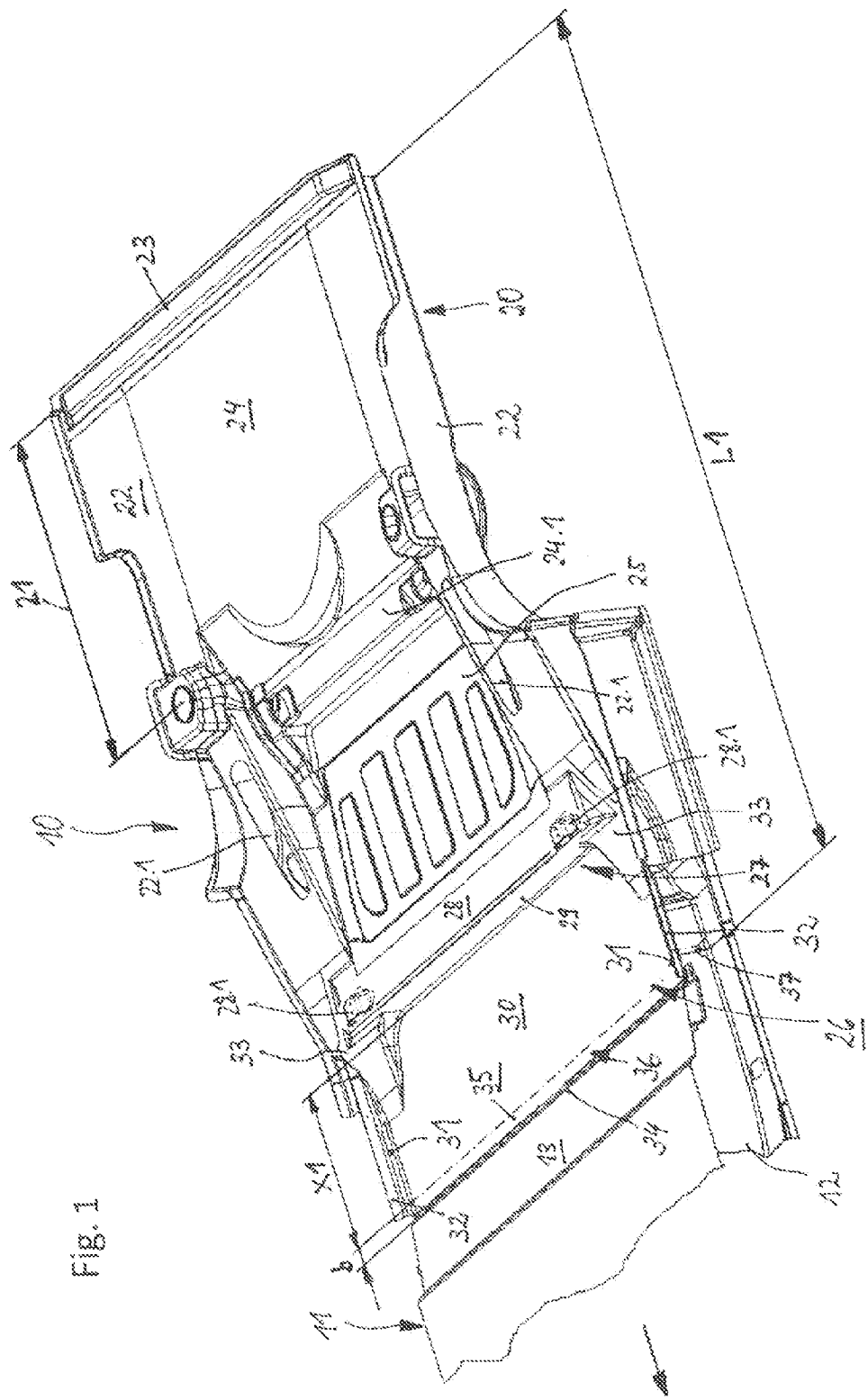
FIG. 1 is a longitudinal section formed of a rear underbody structure and a middle underbody structure of a first underbody structure designed for a long wheelbase in three-dimensional view from above.

The following detailed description is merely exemplary in nature and is not intended to limit the present disclosure or the application and uses of the present disclosure. Furthermore, there is no intention to be bound by any theory presented in the preceding background or the following detailed description.

The passenger car underbody structures shown in the FIGS. 1 and 2 are of identical design except for the different tail overhangs and the different wheelbases, so that for both Figures same reference numbers are used.

According to FIG. 1, a detail of a passenger car underbody structure 10 is shown, which comprises a front vehicle that is not shown, that is connected to a middle underbody structure 11. The latter comprises lateral longitudinal frames 12 (only one is shown), on which a middle floor panel 13 extending between these is fixed, for example, through welding.

The middle underbody structure 11 is connected to a rear underbody structure 20, which according to this exemplary embodiment is equipped with a long tail overhang 21 with respect to a rear axle that is not shown. The rear underbody structure 20 in the present case is designed for a long wheelbase and, like the middle underbody structure 11, comprises lateral longitudinal frames 22, the rear ends of which are connected to a cross member 23. Between the lateral longitudinal frames 22 a rear floor portion 24 serving as trunk floor is arranged, which is connected to the cross member 23, the side members 22 and a cross member 24.1, for example, by means of a welded connection.

A rear floor panel 25 likewise arranged between the side members 22, whose end facing the middle underbody structure 11 is connected to a connecting profile 26 by welding, which in the present case is embodied as deep-drawn sheet metal part and serves as a so-called heel plate is connected to the cross member 24.1. Said heel plate is equipped with a step-like shoulder 27, which on its region facing the rear floor panel 25 is provided with a horizontal web 28, which is connected to the rear floor panel 25 generally through welding.

Arranged in front of the horizontal web 28 in driving direction (indicated by an arrow) is a vertical portion 29 connected to said web, to which in turn a horizontal portion 30 is unitarily connected. The horizontal portion 30 in the present case is molded as a shell that is open on one side and created through deep-drawing of a sheet metal blank with shell side walls 31 and a shell rear wall which is formed by the vertical portion 29. The shell side walls 31 in the present case have an angled-off region designed in the manner of a flange at their free edge, which serves as connecting flange 32. In the horizontal portion 30, in the region of the vertical portion 29, adjacent to the shell side walls 31, mountings 33 are molded in (see also FIG. 3 in this regard), in which the side members 22 of the rear underbody structure 20 engage and are fastened.

The horizontal portion 30 on its end 34 facing the middle underbody structure 11 is of an open edge design and connected to the middle floor panel 13 subject to forming an overlap region 35 generally through welding.

With a rear underbody structure that is suitable for a long wheelbase, as the rear underbody structure 20 represents, the overlap region 35 is spaced from the vertical portion 29 by a predetermined dimension X1. The overlap region 35 formed through the overlapping ends of the middle floor panel 13 and of the horizontal portion 30 forms a connecting portion 36 for coupling the middle underbody structure 11 to the rear underbody structure 20.

A further connecting region 37 between the middle underbody structure 11 and the rear underbody structure 20 is formed between lateral side members 12 and the lateral side members 22.

With a rear underbody structure designed for a long wheelbase and a large tail overhang, as is represented by the rear underbody structure 20 according to FIG. 1, the lateral side members 22 have a length L1.

With an underbody structure 40 designed for a short wheelbase and a shortened tail overhang, as is shown according to FIG. 2, the length L1 of the side members 22 is shortened by a length portion ΔL to a length L2.

The length portion ΔL can be composed of part length portions of which a part length portion is cut off to length on the free rear end of the lateral side members 22, as a result of which a tail overhang 21.1 is created, the length of which is shortened relative to the tail overhang 21 shown in FIG. 1. Another part length portion can be cut to length on the side members 22, on their ends facing the middle underbody structure, as a result of which a passenger car underbody structure is created, the wheelbase of which relative to the wheelbase of the underbody structure as shown and described in FIG. 1, is shortened.

The passenger car underbody structure 10 shown in FIG. 2 has a shortened wheelbase compared with the passenger car underbody structure 10, as shown in FIG. 1. The overlap region 35 between the horizontal portion 30 of the connecting profile 26 and the middle floor panel 13 however has a width b, which corresponds to the width b of the overlap region 35 of the underbody structure 10 according to FIG. 1. In contrast with the overlap region 35 for the long wheelbase according to FIG. 1, the overlap region for the short wheelbase according to FIG. 2 however is spaced from the vertical portion 29 by a predetermined spacing X2, which is designed shorter than the spacing X1. The shortening of the spacing X2 leads to a shortening of the connecting profile 26 by the dimension ΔX (see FIG. 3 and FIG. 4 in this regard) for creating a uniformly wide overlap region.

As is evident both from FIG. 1 as well as from FIG. 2, the side members 22 on their top side in the region of the rear floor panel 25 comprise mountings 22.1 shaped in an elongated manner which serve for the rearward fastening of rear seats that are not shown. For the fastening of the rear seats on the front side, fastening elements 28.1 are provided on the connecting profile 26 in the region of its vertical portion 29, which in the present case are designed frame-like and are fastened to the horizontal web 28, for example, through welding.

FIG. 4 shows a second exemplary embodiment of a connecting profile 40, which merely differs from the connecting profile 26 in that it is divided into two profile portions 41 and 42 in width direction and comprises a recess 43 that is open on the edge, which in the present case serves to accommodate a function part 44, such as, for example, a cover for a handbrake cable or the like.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An underbody structure for at least two motor vehicles having a first and a second wheelbase, comprising:
   a middle underbody structure having a floor;
   a rear underbody structure with laterally arranged side members; and
   at least one connecting profile arranged between the middle underbody structure and rear underbody structure, the at least one connecting profile connected to the laterally arranged side members and to the floor of the middle underbody structure to form a first overlap region for the first wheelbase and a second overlap region for the second wheelbase,
   wherein the first overlap region and the second overlap region have approximately a same width.

2. The underbody structure according to claim 1, wherein the at least one connecting profile has a step running between the laterally arranged side members, the step comprising:
   a horizontal portion comprising the first overlap region; and
   a vertical portion, from which the first overlap region is spaced by a predetermined dimension.

3. The underbody structure according to claim 1, wherein the at least one connecting profile of the side members is divided, in longitudinal direction, into at least two part portions, which accommodate between them a function part.

4. The underbody structure according to claim 2, wherein the first overlap region is arranged on a transverse edge of the horizontal portion, facing the middle underbody structure.

5. The underbody structure according claim 2, wherein the at least one connecting profile comprises a horizontal portion, wherein the horizontal portion comprises:
   an open side;
   shell side walls, each of the shell side walls comprising a respective angled off region, wherein each respective angled off region comprises a connecting flange; and
   a shell rear wall, comprising the vertical portion.

6. The underbody structure according to claim 1, wherein the at least one connecting profile comprises a vertical portion, wherein the vertical portion comprises mountings, and wherein the laterally arranged side members are fastened to the mountings.

7. The underbody structure according to claim 1, wherein the at least one connecting profile comprises a horizontal portion, wherein the horizontal portion is laterally provided with connecting flanges.

8. A motor vehicle, comprising:
   a middle underbody structure having a floor;
   a rear underbody structure with laterally arranged side members; and at least one connecting profile arranged between the middle underbody structure and rear underbody structure, the at least one connecting profile connected to the laterally arranged side members and to the floor of the middle underbody structure to form a first overlap region for a first wheelbase and a second overlap region for a second wheelbase, wherein the first overlap region and the second overlap region have approximately a same width.

9. The motor vehicle according to claim 8, wherein the at least one connecting profile comprises a vertical portion, wherein the vertical portion comprises mountings, and wherein the laterally arranged side members are fastened to the mountings.

10. The motor vehicle according to claim 8, wherein the at least one connecting profile comprises a horizontal portion, wherein the horizontal portion is laterally provided with connecting flanges.

11. The motor vehicle according to claim 8, wherein the at least one connecting profile has a step running between the laterally arranged side members, the step comprising:

a horizontal portion comprising the first overlap region; and a vertical portion, from which the first overlap region is spaced by a predetermined dimension.

12. The motor vehicle according to claim 8, wherein the at least one connecting profile of the side members is divided, in longitudinal direction, into at least two part portions, which accommodate between them a function part.

13. The motor vehicle according to claim 11, wherein the first overlap region is arranged on a transverse edge of the horizontal portion, facing the middle underbody structure.

14. The motor vehicle according claim 8, wherein the at least one connecting profile comprises a horizontal portion, wherein the horizontal portion comprises:

an open side;

shell side walls, each of the shell side walls comprising a respective angled off region, wherein each respective angled off region comprises a connecting flange; and a shell rear wall, comprising the vertical portion.

* * * * *